Aug. 2, 1932.  G. F. THOMAS  1,869,722
LUBRICANT COMPRESSOR
Filed Oct. 29, 1928  2 Sheets-Sheet 1
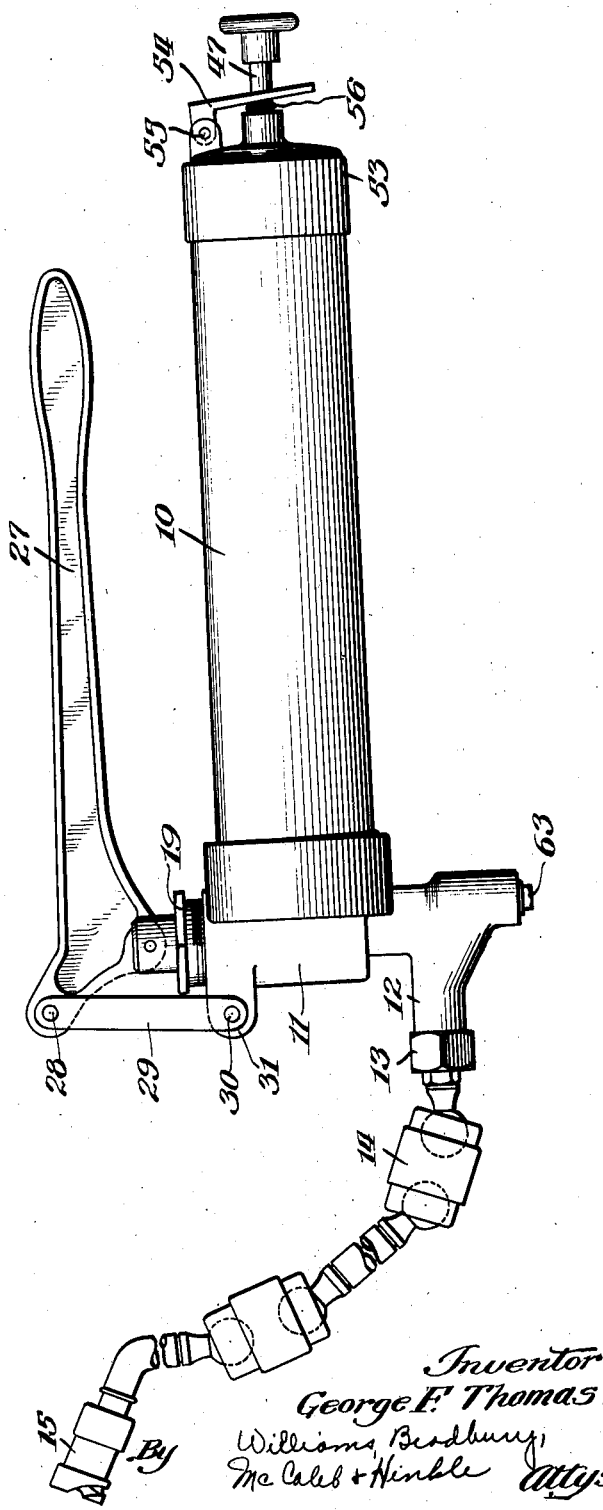

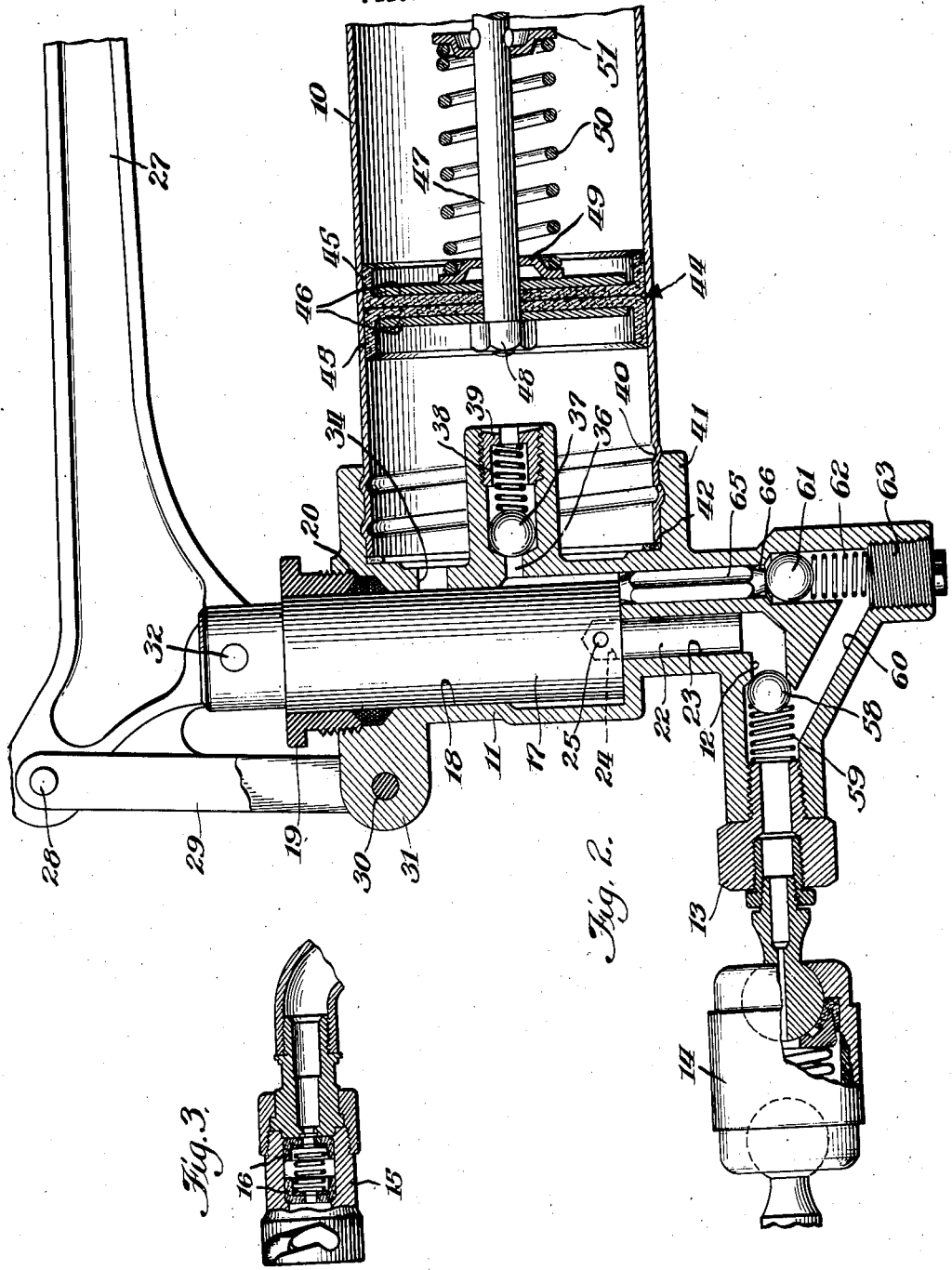

Patented Aug. 2, 1932

1,869,722

UNITED STATES PATENT OFFICE

GEORGE F. THOMAS, OF BERWYN, ILLINOIS, ASSIGNOR TO ALEMITE CORPORATION, OF CHICAGO, ILLINOIS, A CORPORATION OF DELAWARE

LUBRICANT COMPRESSOR

Application filed October 29, 1928. Serial No. 315,635.

This invention relates to lubricant compressors and more particularly to lubricant compressors of the high pressure type.

In lubricant compressors of the type having a high pressure cylinder for compressing a lubricant and a discharge conduit for transmitting the lubricant to a bearing to be lubricated, the cylinder in which the lubricant is compressed must be comparatively small in order to build up a high pressure. This allows for the flow of small quantities of lubricant at a very high pressure. Should the bearing be a large one and require a large amount of lubricant before sufficient resistance is built up in the discharge conduit to require a higher degree of pressure, the operator is required to perform a large number of pumping operations in order to fill the bearing, or a separate compressor having a larger lubricant compressing cylinder must be used to inject large quantities of lubricant under low pressure until the bearing is well filled and then a different compressor having a smaller high pressure cylinder must be used to inject small quantities of grease under relatively high pressure.

In such lubricators a great pressure is generally built up in the discharge conduit and in the coupling member used to effect a connection with a lubricant receiving fitting. In the use of such a device the pressure in the conduit often becomes very high which increases the efficiency of the seal between the coupling member and lubricant receiving fitting, causing this seal to become very tight. Upon completion of the lubricating operation and when the operator desires to disconnect the coupling from its connection with the lubricant receiving fitting, the pressure existing in the conduit resists this disconnecting operation, thereby requiring additional exertion of force to disconnect the coupling.

Also, after the disconnection has been effected, any compressed air contained in the lubricant in the conduit and coupling will expand because of the release of this pressure and as a result lubricant will exude from the coupler after the disconnection has been made, in a very undesirable manner.

To alleviate these difficulties, my invention provides a universal compressor adapted to discharge both large amounts of lubricant under relatively low pressure and small amounts of lubricant under relatively higher pressure by the use of a dual large and small piston in the pumping mechanism of my compressor, combined with a pressure relief valve which allows a primary low pressure operation and automatically controls the mechanism to change the discharge of lubricant to high pressure operation when the bearing is filled sufficiently to build up a resistance in the discharge conduit.

My invention also provides automatic means operating after the lubricating operation to relieve the conduit of excess pressure therein without additional manual effort on the part of the operator. This allows the coupler to be disconnected from the fitting easily, in a clean condition, and free from lubricant which might otherwise exude from the coupling after disconnection. This I accomplish by the use of a pressure relief valve which is operated by the plunger of my compressor, which valve acts to relieve the pressure in the discharge conduit before disconnection of the coupler.

An object of my invention is to provide a lubricant compressor adapted to discharge lubricant in large quantities under a relatively low pressure and means to change this discharge to smaller quantities under relatively higher pressure during the continuous operation of the compressor.

Another object of my invention is to provide a lubricant compressor adapted to discharge lubricant under relatively low pressure to a discharge conduit and means operable upon the building up of a predetermined pressure in the discharge conduit to regulate the discharge of lubricant and increase the amount of pressure under which it is discharged.

Another object of my invention is to provide a lubricant compressor having means controlled by the operating mechanism of the compressor to automatically regulate the amount of pressure under which lubricant will be discharged from the compressor.

Another object of my invention is to provide in a high pressure lubricant compressor means to relieve the pressure in the discharge conduit upon the completion of the compressing operation.

Another object of my invention is to provide in a high pressure lubricant compressor means to relieve the pressure in the discharge conduit automatically upon completion of the compressing operation.

Still another object of my invention is to provide in a high pressure lubricant compressor means to relieve the pressure in the discharge conduit at a predetermined time, which means is actuated by the compressing mechanism.

Further objects and advantages will become apparent from the following detailed description and accompanying drawings, in which Figure 1 is a side elevation of the lubricant compressor of my invention shown with the discharge conduit and coupling connected therewith;

Figure 2 is an enlarged fragmentary sectional view illustrating the working elements of my invention; and Figure 3 is an enlarged fragmentary sectional view of the coupling member used in my invention.

Referring to the drawings in which like reference characters designate like parts throughout the several views, the numeral 10 indicates a lubricant supply chamber which is preferably cylindrical in shape and is adapted to be secured to a body member 11 which contains the pumping mechanism. This body member 11 is provided with a main discharge outlet 12 which is provided with a fitting 13 for attachment to a flexible discharge conduit 14. This discharge conduit 14 may be of any of the well known types of conduits, the one illustrated in the drawings of my application being a high pressure grease conduit of the type shown in the patent to W. F. Hundemer, No. 1,603,916.

A coupling member 15, for effecting connection with a lubricant receiving fitting, is attached to the end of the discharge conduit 14 and is of a well known type shown in the patent to Gullborg, No. 1,307,734, and has bayonet slots for making a connection with the fitting and spring pressed leather sealing members 16 for effecting a seal between the fitting and discharge conduit. When disconnecting this coupler from the fitting it must be moved forwardly to pass over raised portions in the bayonet slots and this moves the spring pressed sliding member inwardly and compresses the lubricant in the discharge conduit so that great force must be applied to effect the disconnection, when the lubricant in the discharge conduit is already under great pressure.

The compressing mechanism for discharging lubricant through the outlet 12 and conduit 14 comprises a plunger 17 which fits snugly and reciprocates within a cylinder 18 in the body member 11 and also reciprocates within a packing nut 19 which retains a suitable packing washer 20 in position to prevent leakage of lubricant.

A second or high pressure plunger 22 of smaller diameter than the plunger 17 is mounted upon one end of the plunger 17 and adapted to reciprocate with the plunger 17 and within a small high pressure cylinder 23 which is in axial alignment with the larger cylinder 18.

The plunger 22 is mounted within a socket 24 of the plunger 17 and secured by a pin 25. This allows the plunger 22 to move slightly relative to the plunger 17 to allow for slight irregularities in the alignment of the cylinders 18 and 23. The plungers 17 and 22 are actuated by means of a handle 27 pivotally secured by a rivet 28 or other suitable means to a link 29 which is in turn pivoted by a pin 30 to a raised boss 31 of the body member 11. The handle 27 is pivotally secured to the plunger 17 by means of a pin 32. Through this linkage a movement of the handle 27 toward the lubricant supply chamber 10 will move the plungers 17 and 22 inwardly.

A suitable port 34 is placed intermediate the inner and outer ends of the cylinder 18 and communicates with the lubricant supply chamber 10 to permit lubricant to flow into the interior of the body member 11. When the plunger 17 has been withdrawn a sufficient distance to expose the port 34, lubricant may pass therethrough into the cylinder 18, as will hereinafter be described. When the plunger is reciprocated inwardly the port 34 will be closed and lubricant is entrapped within the cylinder 18 and forced outwardly through the discharge outlet 12 and a discharge outlet 66 which will be more fully described hereinafter.

When the cylinder 18 is filled with a charge of lubricant and the plunger 17 is moved inwardly, forcing the lubricant into the high pressure cylinder 23, the lubricant will be discharged through the outlet 12 and through the discharge outlet 66 and a passageway 60 connecting this outlet with the outlet 12. Such discharge will continue under a relatively low pressure and large quantities of lubricant will be displaced from the cylinder 18 and discharged through the two outlets 12 and 66 to the bearing to be lubricated. When the bearing is nearly filled with lubricant the pressure in the discharge conduit will consequently become greater and as this pressure is increased more resistance is offered to the pumping action. It will then become advisable to utilize the high pressure cylinder 23 and the plunger 22 therein to discharge further lubricant into the conduit at a much higher pressure, although the quantity will be slightly decreased.

To accomplish this result, means is provided to allow the lubricant which does not enter the high pressure cylinder 23 before the entrance of the plunger 22, to be returned to the supply chamber 10. This means consists in having the inward portion of the cylinder 18 slightly enlarged to allow lubricant to flow between the plunger 17 and the side wall of the cylinder 18 into a by-pass opening 36 in the body member 11, thence past a ball check valve 37 maintained in position by a spring 38 which is held in place by a suitable plug 39.

The lubricant supply chamber 10 is secured to the body member 11 by any suitable means, such as a threaded connection 40 provided upon a flange 41 extending from the body member 11. A washer 42, of fiber or any other suitable material, is incorporated in this connection to secure an air-tight fit. A follower 44 is arranged within the lubricant supply chamber 10 and adapted to rest upon the surface of a charge of lubricant. This follower is constructed of a pair of cup-leathers 45 of suitable material, such as leather, and having a central metal disc 46 positioned within the cup-leather, the cup-leathers being mounted on a centrally located rod 47 by means of a nut 48 threaded on one end of the rod 47 and by a washer 49 which is held tightly against one of the cup-leathers 45 by a compression spring 50 which rests upon a metal washer 51 which is secured to the rod 47 by roughing the rod or in any other suitable manner. The rod 47 is adapted to reciprocate in a head 53 located at one end of the lubricant supply chamber 10 and secured thereto by a threaded connection, or in any other suitable manner.

The rod 47 passes through an apertured locking lever 54 which is pivotally mounted on the head 53 by means of a pin 55 and is urged toward the outer end of the rod 47 by means of a suitably mounted compression spring 56. The aperture in this locking lever 54 is slightly larger than the diameter of the rod 47 so that the rod will be gripped, thereby preventing its being withdrawn outwardly except when the lever is rotated to align the aperture therein with the rod. This rotation is resisted by the spring 56. The rod, however, can move inwardly step by step as the lubricant is withdrawn from the compressor because the inward movement will automatically rotate the locking lever 54.

The discharge outlet 12 contains a ball check valve 58 retained on its seat by a compression spring 59 and this valve allows lubricant to pass outwardly toward the discharge conduit 14 but prevents the return of lubricant or entrance of air into the discharge outlet 12. When the handle 27 is drawn away from the lubricant chamber 10, drawing the plungers 17 and 22 outwardly, the large plunger 17 creates a strong vacuum in the cylinders 18 and 23 so that when the plunger 17 is withdrawn a sufficient distance to uncover the port 34, lubricant contained in the chamber 10 will be drawn in to fill the cylinder 18.

Upon movement of the handle 27 to reciprocate the plunger 17 inwardly, the plunger 17 will close the port 34 and force the lubricant through the cylinder 23 and the discharge outlets 12 and 66 into the conduit 14. The cylinder 23 is thus completely filled with lubricant.

The passageway 60, hereinbefore mentioned, communicates with the cylinder 18 at the enlarged end thereof so that lubricant may flow outwardly to the outlet 12. A ball check valve 61 is located in the passageway 60 and is held in position by a spring 62 which is of less tension than the spring 38 which holds the ball check valve 37 on its seat.

The spring 62 is held in place by a screw-threaded plug 63 which is arranged to allow access to the passageway 60. The ball check valve 61 normally remains closed and prevents return of lubricant from the discharge outlet 12. A hexagonal valve rod 65 is reciprocably mounted in the bore 66 located in the body member 11 in alignment with the cylinder 18 and communicating with said cylinder 18 at the inner end thereof. The valve 61, under normal conditions, will open upon each stroke of the compressing mechanism to allow lubricant to flow into the discharge outlet 12 when the pump operation is being performed under a relatively low pressure. This additional outlet aids in rapidly filling a bearing. When the bearing has become nearly filled and a great pressure is built up in the discharge outlet, the ball check valve 61 will remain on its seat and when the pressure has become great enough, lubricant will not be discharged through the bore 66 and passageway 60, but the spring 38 will be compressed and lubricant which is not discharged into the high compression cylinder 23 will be returned to the container 10 through the by-pass 36 when the high pressure plunger 22 enters the high pressure cylinder 23. Thereupon lubricant will be discharged through the outlet 12 under relatively higher pressure than when both the outlets 66 and 12 were being used before the pressure became great enough to overcome the spring 38. The valve rod 65 is adapted to be engaged by the plunger 17 as the latter approaches the end of the cylinder 18, whereby the valve rod 65 will be moved forwardly to unseat the ball check valve 61 and allow excess lubricant under pressure to escape from the passageway 60 past the ball check valve 61 through the bore 66, between the open spaces afforded by the hexagonal shape of the valve rod 65, into the cylinder 18 and thence through the by-pass 36 into the chamber 10. The valve rod 65 is of sufficient length in respect to the distance between the inner end of the cylinder 18 and the top of the ball check valve 61 so that when the plunger 17 is a very short distance from the end of its stroke it will engage the valve rod 65 to open the valve.

The spring 62 is of a predetermined strength sufficient to maintain the ball check valve 61 on its seat to prevent return of lubricant from the discharge outlet in the normal operation of the device. It will be noted that when the resistance in the part to be lubricated and discharge conduit is low that lubricant may be forced out to the discharge conduit 14 through the passageway 60 as well as through the outlet 12. This speeds up the filling of a bearing at low pressure where a large quantity of lubricant is required before the resistance becomes great enough to require high pressure to force lubricant into the bearing.

To operate the device, the lubricant supply chamber 10 is unscrewed from its engagement with the body member 11 and the rod 47 is pushed inwardly so that the follower 44 is nearly to the screw threads 40 of the chamber 10. By rotating the locking lever 54 to allow the rod 47 to be withdrawn and placing the open end of the lubricant chamber 10 into a supply of lubricant, the rod 47 may be withdrawn and the lubricant will be drawn into the chamber 10 by reason of the suction created by the withdrawal of the follower 44. The body member 11 is then engaged with the chamber 10. The outward end of the rod 47 should be forced in toward the cup-leather to pack the lubricant in the compressor, and the spring 50 will thus be compressed and the cup-leather 45 will feed the lubricant to the port 34 under spring pressure.

By actuating the lever 27 to cause withdrawal of the plunger 17, as hereinbefore described, the great vacuum created in the cylinder 18 will cause the cylinder to be filled with a charge of lubricant from the lubricant supply chamber 10 through the port 34. Then the plunger 17 is moved inwardly discharging lubricant through the high pressure cylinder 23 and outlet 12 and through the bore 66 and passageway 60. The operator continues this pumping action forcing lubricant out through the two outlets to the discharge conduit and into the bearing until the bearing is filled enough to build up a high resistance in the discharge conduit, thereby to allow the lubricant ordinarily discharged by the large plunger 17 under low pressure to be returned to the lubricant container 10 through the by-pass 36 and relief valve 37. Then, if the operator continues the pumping action, the compressing and discharge of lubricant will be through the action of the plunger 22 in the high pressure cylinder 23 which will thereafter discharge lubricant under an extremely high pressure until the lubricating operation is completed.

Thus, we have a compressor universally adapted to fill bearings where only low pressure is required or to fill bearings where extremely high pressure is required, or to fill bearings where a primary low pressure is desirable to more rapidly supply large quantities of lubricant under low pressure, and through the use of my invention, without any interruption on the part of the operator, to change this discharge of lubricant automatically to extremely high pressure to complete the operation.

When the bearing to be lubricated is completely filled with lubricant, lubricant in the conduit is under extremely high pressure. The ball check valve 58 prevents the return of this lubricant to the compressor. If the coupler were disconnected from the lubricant receiving element at this point, it would require a great deal of manual force to disconnect the raised portions in the bayonet slots of the coupler because the cup-leathers 16 of the coupler are thus compressed and the pressure in the conduit 14 becomes still higher. Besides the requirement of a great deal of physical exertion on the part of the operator, the compressed air contained in the lubricant would cause lubricant to exude from the coupler.

This unsatisfactory condition is prevented by the engagement of the plunger 17 with the plunger 65 which releases the ball check valve 61, allowing the lubricant to be returned to the chamber 10, whereupon the lubricant in the conduit is relieved of pressure and the coupler may be disconnected freely and in a clean condition, free from discharge of lubricant after disconnection.

Having thus explained my invention, what I claim as new and desire to secure by Letters Patent is:

1. In a portable hand operated lubricant compressor adapted to discharge lubricant under high pressure, a supply chamber, a discharge conduit, a cylinder disposed between said chamber and said conduit, a lever operated plunger in said cylinder to draw lubricant from said chamber into the cylinder and thereupon force it into said conduit, and valvular means separate from and actuated by said plunger to allow excess lubricant in said condiut to be returned to said cylinder from said conduit.

2. In a portable hand operated lubricant compressor adapted to discharge lubricant under high pressure, a supply chamber, a discharge conduit, a cylinder disposed between said chamber and said conduit, a lever operated plunger reciprocable in said cylinder to draw lubricant from said chamber on the intake stroke and force it into said conduit on the discharge stroke, and check valve means operable by said plunger upon the discharge stroke thereof to allow excess lubricant in said conduit to be returned to the supply chamber upon a predetermined movement of said plunger.

3. In a portable hand operated lubricant compressor, the combination of a supply chamber, a discharge conduit, a cylinder communicating with said supply chamber and discharge conduit, a lever operated plunger reciprocable in said cylinder to discharge lubricant therefrom into the discharge conduit, valvular means to prevent return of the discharged lubricant to the cylinder, and secondary valvular means actuated by the plunger upon the discharge stroke thereof to permit return of a part of said discharged lubricant to the cylinder.

4. The combination in a portable hand operated lubricant compressor of a supply chamber, a discharge conduit, a cylinder communicating with said supply chamber and said discharge conduit, a lever operated plunger reciprocable in said cylinder to draw lubricant into the cylinder from the supply chamber and thereafter to discharge the lubricant under pressure from said cylinder into the discharge conduit, valvular means in said discharge conduit to prevent return of the discharged lubricant to the cylinder, and secondary valvular means movable by the plunger only at the end of its discharge stroke to permit the return of a portion of the lubricant to the cylinder.

5. The combination in a portable hand operated lubricant compressor of a supply chamber, a discharge conduit, a cylinder communicating with said supply chamber and discharge conduit, a lever operated plunger reciprocable in said cylinder to draw lubricant into the cylinder from the supply chamber and thereafter to discharge the lubricant under pressure from said cylinder into the discharge conduit, a valve disposed in said discharge conduit to prevent return of the discharged lubricant to the cylinder, a second valve separate from said plunger disposed between the discharge conduit and supply chamber, and means actuated by movement of the plunger in the same direction as the discharge stroke to open said second valve and permit lubricant in the discharge conduit to return to the cylinder.

6. The combination in a lubricant compressor of a supply chamber, a discharge conduit, a cylinder communicating with said supply chamber and said discharge conduit, a plunger reciprocable in said cylinder to draw lubricant into the cylinder from the supply chamber and thereafter to discharge the lubricant under pressure into the discharge conduit, a valve disposed in said discharge conduit to prevent return of the lubricant from the discharge conduit, a second valve disposed between the discharge conduit and the cylinder, and a member disposed between said second valve and the cylinder adapted to be engaged by the plunger to actuate said second valve and permit return of a portion of the lubricant.

7. The combination in a lubricant compressor of a supply chamber, a discharge conduit, a cylinder communicating with said supply chamber and said discharge conduit, a plunger reciprocable in said cylinder to draw lubricant into the cylinder from the supply chamber and thereafter to discharge the lubricant under pressure into the discharge conduit, a valve disposed between said cylinder and discharge conduit to prevent return of lubricant from the discharge conduit, a passageway between the supply chamber and discharge conduit, valvular means normally closing said passageway to prevent return of lubricant from the discharge conduit, and means operable by the plunger upon reciprocation to actuate said valvular means and open the passageway to permit return of lubricant from the discharge conduit.

8. In a lubricant compressor, a lubricant container, a discharge outlet, a one-way outwardly opening valve in said outlet, pumping means to transmit lubricant from the container to a point beyond said valve in the discharge outlet, a passageway extending from the container to a point beyond the valve in the discharge outlet, a second valve in said passageway normally closing the passageway, and a valve rod in said passageway operable by the pumping means to actuate the second valve and open the passageway.

9. In a lubricant compressor, a lubricant container, a discharge outlet, a one-way outwardly opening valve in said outlet to permit egress of lubricant, pumping means to transmit lubricant from the container to a point beyond said valve in the discharge outlet, a passageway extending from the container and communicating with the discharge outlet at a point beyond said valve, a valve seat in said passageway, a second valve in said passageway resting upon said seat, a spring arranged to maintain said second valve against said seat to close the passageway and prevent ingress of lubricant, and a valve rod reciprocable in said passageway and operable by the pumping means to compress the valve spring and unseat said second valve to permit ingress of lubricant from the discharge outlet.

10. In a lubricant compressor, a discharge conduit, a supply chamber, a low pressure discharge cylinder, a plunger reciprocable therein to discharge lubricant therefrom, a connecting high pressure cylinder and a high pressure plunger reciprocable therein to discharge lubricant therefrom, a discharge outlet disposed between the high and low pressure cylinders and the discharge conduit, a second discharge outlet between the low pressure cylinder and the discharge conduit, and a pressure relief valve between the low pressure cylinder and supply chamber to allow return of lubricant from the low pressure cylinder.

11. In a lubricant compressor, a discharge conduit, a supply chamber, a low pressure discharge cylinder, a plunger reciprocable therein, a connecting high pressure discharge cylinder, a plunger reciprocable therein, a discharge outlet disposed between the high and low pressure cylinders and the discharge conduit, a second discharge outlet between the low pressure cylinder and the discharge conduit, and a valve in the low pressure cylinder responsive to the pressure of the lubricant in the discharge conduit to cause lubricant in the low pressure cylinder to be returned to the supply chamber.

12. In a lever operated lubricant compressor, a lubricant container, a separate pressure chamber, a discharge conduit, a low pressure plunger reciprocable in said chamber to discharge lubricant therefrom under low pressure, and a connected high pressure plunger to discharge lubricant under high pressure, said low pressure plunger being effective to cause the discharge of lubricant throughout the entire length of the stroke only when the pressure in the discharge conduit is relatively low.

13. In a lubricant compressor, a discharge conduit, a low pressure cylinder of relatively large diameter, a high pressure cylinder of relatively small diameter in axial alignment therewith, a low pressure plunger reciprocable within the low pressure cylinder, a connected high pressure plunger reciprocable within the high pressure cylinder, a passageway between the high pressure cylinder and the discharge conduit whereby lubricant may be discharged under high or low pressure, and a separate connection between the large diameter low pressure cylinder and the discharge conduit whereby lubricant may be discharged by the low pressure plunger when the high pressure cylinder almost to the end of a discharge stroke.

In witness whereof, I hereunto subscribe my name this 19th day of October, 1928.

GEORGE F. THOMAS.